US012604799B2

(12) United States Patent
Park et al.

(10) Patent No.: US 12,604,799 B2
(45) Date of Patent: Apr. 21, 2026

(54) RIDING-TYPE MOWING APPARATUS

(71) Applicant: DAEDONG MOBILITY CORP., Anseong-si (KR)

(72) Inventors: Sang Ji Park, Jeonju-si (KR); Min Kyu Sun, Daegu (KR)

(73) Assignee: DAEDONG MOBILITY CORP., Anseong-si (KR)

( * ) Notice: Subject to any disclaimer, the term of this patent is extended or adjusted under 35 U.S.C. 154(b) by 373 days.

(21) Appl. No.: 18/372,674

(22) Filed: Sep. 25, 2023

(65) Prior Publication Data

US 2024/0397857 A1 Dec. 5, 2024

(30) Foreign Application Priority Data

Jun. 2, 2023 (KR) ........................ 10-2023-0071650

(51) Int. Cl.
| | |
|---|---|
| *A01D 69/10* | (2006.01) |
| *A01D 34/64* | (2006.01) |
| *A01D 34/74* | (2006.01) |
| *A01D 101/00* | (2006.01) |

(52) U.S. Cl.
CPC ............. *A01D 34/74* (2013.01); *A01D 34/64* (2013.01); *A01D 69/10* (2013.01); *A01D 2101/00* (2013.01)

(58) Field of Classification Search
CPC ......... A01D 34/74; A01D 34/64; A01D 69/10
See application file for complete search history.

(56) References Cited

U.S. PATENT DOCUMENTS

| | | | | |
|---|---|---|---|---|
| 2,604,962 A | * | 7/1952 | Tibbetts ................ | B60W 10/04 74/562.5 |
| 2,924,119 A | * | 2/1960 | King ...................... | B60K 26/02 74/478.5 |
| 6,530,200 B1 | * | 3/2003 | Minoura ................ | A01D 34/64 56/15.2 |
| 7,434,379 B2 | * | 10/2008 | Nogami ................. | A01D 34/74 56/17.1 |
| 7,562,515 B2 | * | 7/2009 | Komorida ............ | A01D 34/661 56/14.9 |
| 11,690,318 B2 | * | 7/2023 | Conrad ................ | A01D 34/008 56/10.2 A |
| 11,849,669 B2 | * | 12/2023 | Steen ................... | A01D 75/306 |
| 11,937,538 B2 | * | 3/2024 | Matsuda ................ | B60L 50/16 |
| 2016/0295797 A1 | * | 10/2016 | Ito ........................ | A01D 34/006 |

* cited by examiner

*Primary Examiner* — Alicia Torres
(74) *Attorney, Agent, or Firm* — Revolution IP, PLLC

(57) ABSTRACT

A riding-type mowing apparatus includes a mower unit disposed below a body frame to mow grass through a blade mounted in the mower unit, and a driver seat provided on the body frame. A steering lever is provided on both sides of the driver seat to operate traveling of the riding-type mowing apparatus. A brake pedal is provided on a bottom frame disposed in front of the body frame to brake the riding-type mowing apparatus. A lift-down pedal and a lift-up pedal are disposed on both sides of the brake pedal to lift-down and lift-up the mower unit, respectively.

2 Claims, 4 Drawing Sheets

Prior Art

RIDING-TYPE MOWING APPARATUS

BACKGROUND OF THE INVENTION

1. Field of the Invention

The present invention relates to a riding-type mowing apparatus, and more specifically, to an apparatus for conveniently performing lift-up and lift-down operations of a mower unit including a blade and a traveling operation of a mowing apparatus.

2. Description of the Related Art

In general, a mower is an apparatus for cutting vegetation such as grain, grass, and miscellaneous trees, and various types of mower have been developed and used depending on the purpose of use and a shape. In modern times, a mower in the form of a working machine, which is attached to the agricultural machine, has been developed and used because of realization of the mechanization of agricultural machines. However, as the effective value decreases, a riding-type weeding apparatus equipped with an engine capable of performing specialized weeding work has been developed and used in recent years.

FIG. 1 illustrates a riding-type mowing apparatus that is a mowing apparatus manufactured as a working vehicle capable of riding a person, in which the mowing apparatus includes two front wheels 1 and two rear wheels 2, a body frame 10 is provided on the front wheels 1 and the rear wheels 2, the body frame 10 is provided with a chair-type driver seat on which a user may sit and a protective structure (roll over protection system (ROPS)) 12, and levers 14 and 15, which are manipulated with user's hands and may control movement of a zero-mower, are provided in front of the driver seat 11. When the user manipulates the levers, the vehicle moves forward and backward and turns left and right, and a mower unit 3 provided between the front wheels and the rear wheels is lifted up and down.

The mower unit 3 is coupled to the body frame 10 between the front wheels 1 and the rear wheels 2, and includes a deck body 3a equipped with a blade, and a front deck link 13 and a rear deck link 23 configured to lift-up and lift-down the deck body 3a, respectively.

The deck body 3a is lifted down or up through the operation of the front deck link 13 and the rear deck link 23, and when the deck body 3a is lifted down, grass or vegetation may be mowed below the deck body 3a, so that it is possible to smoothly move the vehicle in a state where the deck body 3a is lifted up.

It is known that the conventional riding-type mowing apparatus lifts up and down a mower by manipulating the lift-up and lift-down levers, which are provided at an outer right side of the driver seat, with hands.

In order to improve the turning of a traveling machine, the riding-type grass mowing apparatus moves forward and backward and turns by manipulating steering levers, which are provided on the left and right sides of the driver seat, while independently driving the left and right rear wheels. On the other hand, lift-up and lift-down of the mower unit are manipulated by manipulating the lift-up and lift-down levers, which are provided at sides of the driver seat, with the right or left hand.

When attempting to manipulate the lift-up and lift-down of the mower unit while traveling, it is necessary to manipulate the lift-up and lift-down lever together with the manipulation of the steering levers, but since the steering levers are held with both hands, it is difficult to manipulate the lift-up and lift-down levers of the mower. Therefore, when the lift-up and lift-down of the mower are manipulated, it is necessary to stop the traveling of the riding-type mowing apparatus first, and then manipulate the lift-up and lift-down levers, which results in interference on efficient lawn mowing work.

SUMMARY OF THE INVENTION

An object of the present invention is to efficiently perform mowing work by improving manipulability of a riding-type mowing apparatus in consideration of the problem.

Another object of the present invention is to improve manipulability of a riding-type mowing apparatus by enabling a user to manipulate pedals, for manipulating lift-up and lift-down of a mower unit, separately with his/her left and right feet.

According to an embodiment, a riding-type mowing apparatus, in which a mower unit is disposed below a body frame to mow grass through a blade mounted in the mower unit and a driver seat is provided on the body frame, includes: a steering lever provided on both sides of the driver seat to operate traveling of the riding-type mowing apparatus; a brake pedal provided on a bottom frame disposed in front of the body frame to brake the riding-type mowing apparatus; and a lift-down pedal and a lift-up pedal disposed on both sides of the brake pedal to lift-down and lift-up the mower unit, respectively.

According to the riding-type mowing apparatus of the proposed embodiment, the user who sits on the driver seat may manipulate the lift-up and lift-down of the mower unit by distinguishing the left and right pedals, which are spaced apart from the center by the same distance, with the left and right feet.

In addition, the erroneous operation may be reduced, and both clear distinguishment and convenience of the operation may be achieved by manipulating the traveling of the apparatus and the lift-up and lift-down of the mower unit with hands or feet, respectively.

DETAILED DESCRIPTION OF THE INVENTION

Hereinafter, embodiments of the present invention will be described with reference to the drawings.

Figure 1:
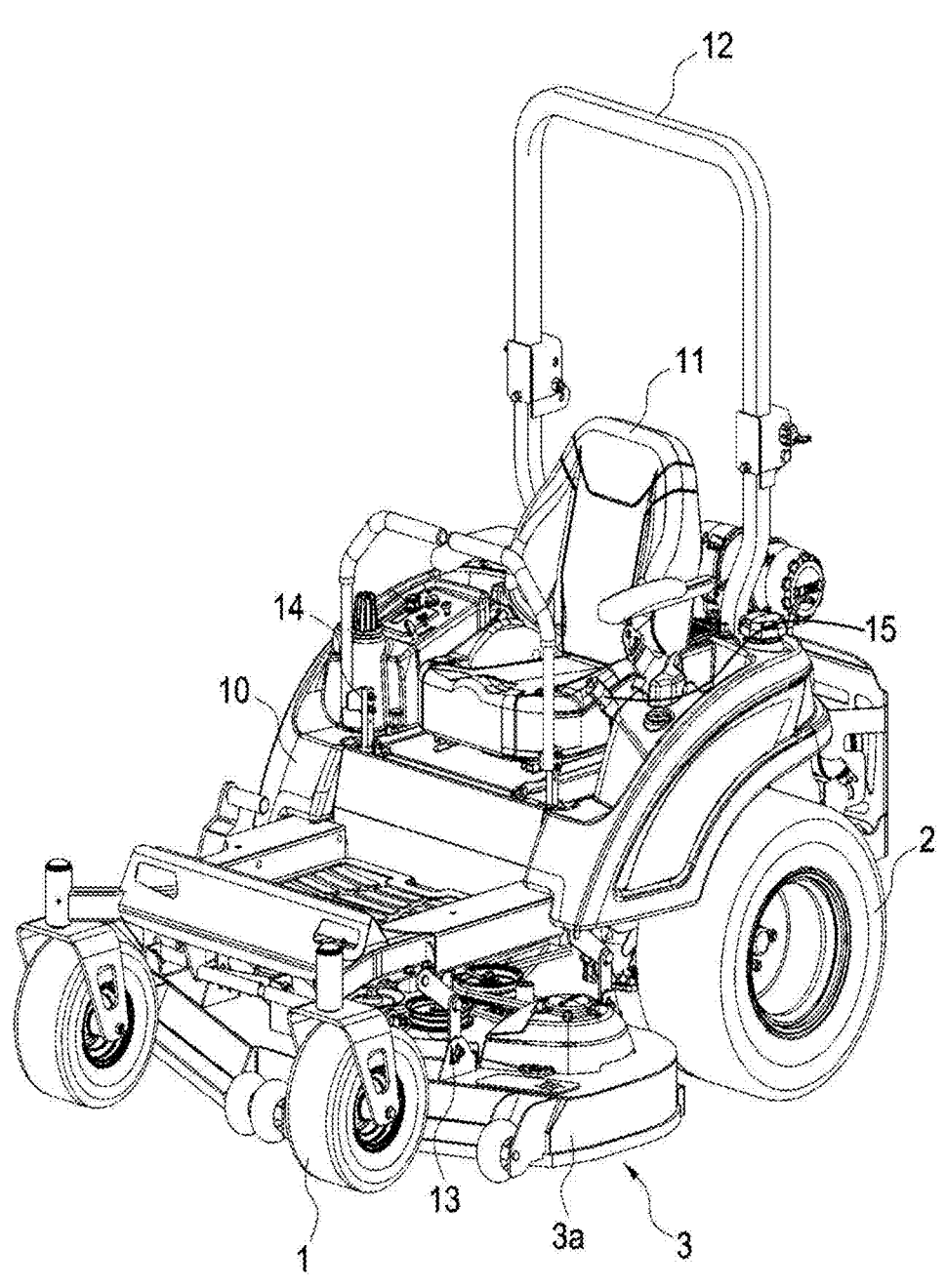
FIG. 1 is a view illustrating a conventional riding-type mowing apparatus.
Figure 2:
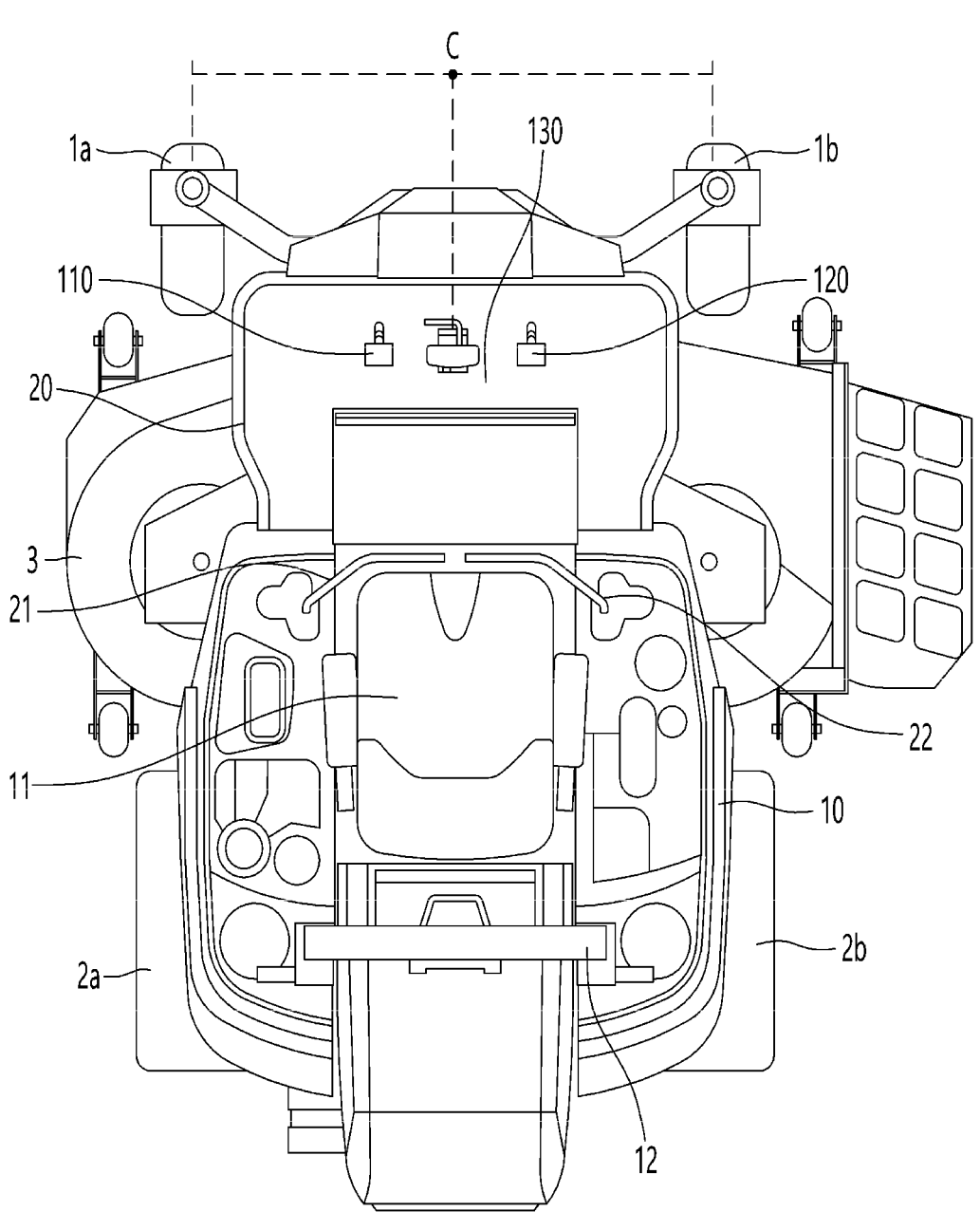
FIGS. 2 and 3 are views illustrating an external configuration of the riding-type mowing apparatus according to the present embodiment.
Figure 3:
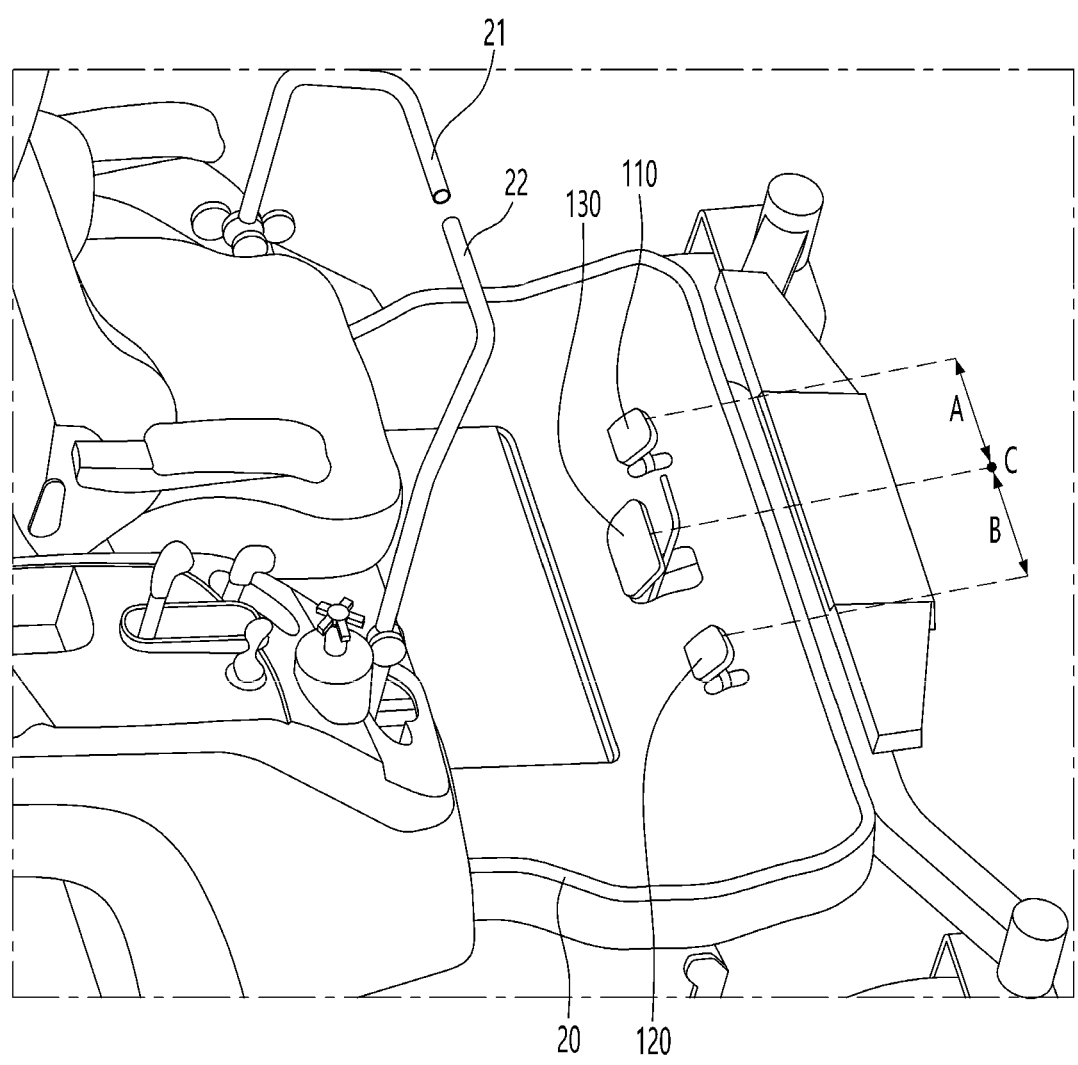

FIGS. 2 and 3 are views illustrating an external configuration of the riding-type mowing apparatus according to the present embodiment.

Referring to FIGS. 2 and 3, the apparatus according to the embodiment includes levers for operating the traveling of a vehicle, such as forward movement, backward movement, and turning, and pedals located at different positions to lift up and down a mower unit 3 including a blade for mowing grass.

In detail, the riding-type mowing apparatus according to the embodiment is provided with two front wheels 1a and 1b, two rear wheels 2a and 2b, and a body frame 10 on the front and rear wheels, and the body frame 10 is provided with a chair-type driver seat 11 on which a user may sit and a ROPS 12.

In addition, a first steering lever 21 and a second steering lever 22 are provided at both sides of the driver seat 11 to manipulate the traveling of the mowing apparatus.

The user may manipulate the first steering lever 21 and the second steering lever 22 to move the mowing apparatus forward and backward and turn the mowing apparatus left and right. For example, when the first steering lever 21 and the second steering lever 22 move forward together, the vehicle may move forward, when the two steering levers are pulled back together, the vehicle may move backward, and when only one steering lever is pushed forward, the vehicle may turn to the left or right.

Further, the apparatus according to the present embodiment includes a lift-down pedal 110 and a lift-up pedal 120, which are configurations for lifting down and up the mower unit including a deck body equipped with a blade, provided with a bottom frame 20 including a brake pedal 130.

That is, the brake pedal 130 for braking the riding-type mowing apparatus to stop the traveling is provided on the bottom frame 20 formed at a lower height than the driver seat 11, and the bottom frame 20 is provided with the lift-down pedal 110 for lifting down the mower unit 3 away from the body frame 10 toward the ground and the lift-up pedal 120 for lifting up the mower unit 3 close to the body frame 10.

In particular, the lift-down pedal 110 and the lift-up pedal 120 are disposed symmetrically to each other with respect to the brake pedal 130, and the lift-down pedal 110 and the lift-up pedal 120 are configured to have the same distance from the brake pedal 130.

This is because the user sits on the driver seat 11 and is guided to manipulate the lift-down pedal 110 with his/her left foot and to manipulate the lift-up pedal 120 with his/her right foot, so that the manipulation of the brake pedal 130 for stopping the movement of the vehicle and the manipulation of the lift-down and lift-up of the mower unit are facilitated without being confused.

If the user presses down the brake pedal 130 with his/her right foot to stop the traveling of the riding-type mowing apparatus, and then presses down the lift-down pedal 110 with his/her left foot, the user may manipulate the mower unit 3 to be lifted down within a short time after the mower unit 3 is stopped. In addition, after the grass is mowed using the mower unit 3 of the riding-type mowing apparatus, the user may accurately and quickly manipulate the mower unit 3 away from the ground by pressing down the lift-up pedal 120 with his/her right foot while pressing down the brake pedal 130 with his/her left foot.

According to the present embodiment, when a central position of the first front wheel 1a and the second front wheel 1b is defined as C, the brake pedal 130 is located on a virtual line connecting position C and the center of the driver seat 11. The lift-down pedal 110 and the lift-up pedal 120 are disposed slightly ahead of the brake pedal 130, and distance A between the lift-down pedal 110 and the brake pedal 130 is the same as distance B between the lift-up pedal 120 and the brake pedal 130. Each of the lift-down pedal and the lift-up pedal is disposed at a position spaced apart from the brake pedal by the same distance, which guides the user to manipulate the lift-down pedal with his/her left foot and to manipulate the lift-up pedal with his/her foot.

Through this arrangement of the pedals (brake pedal, lift-down pedal, and lift-up pedal), the user is less confused about the position of the pedal and may manipulate the pedals more easily.

Figure 4:
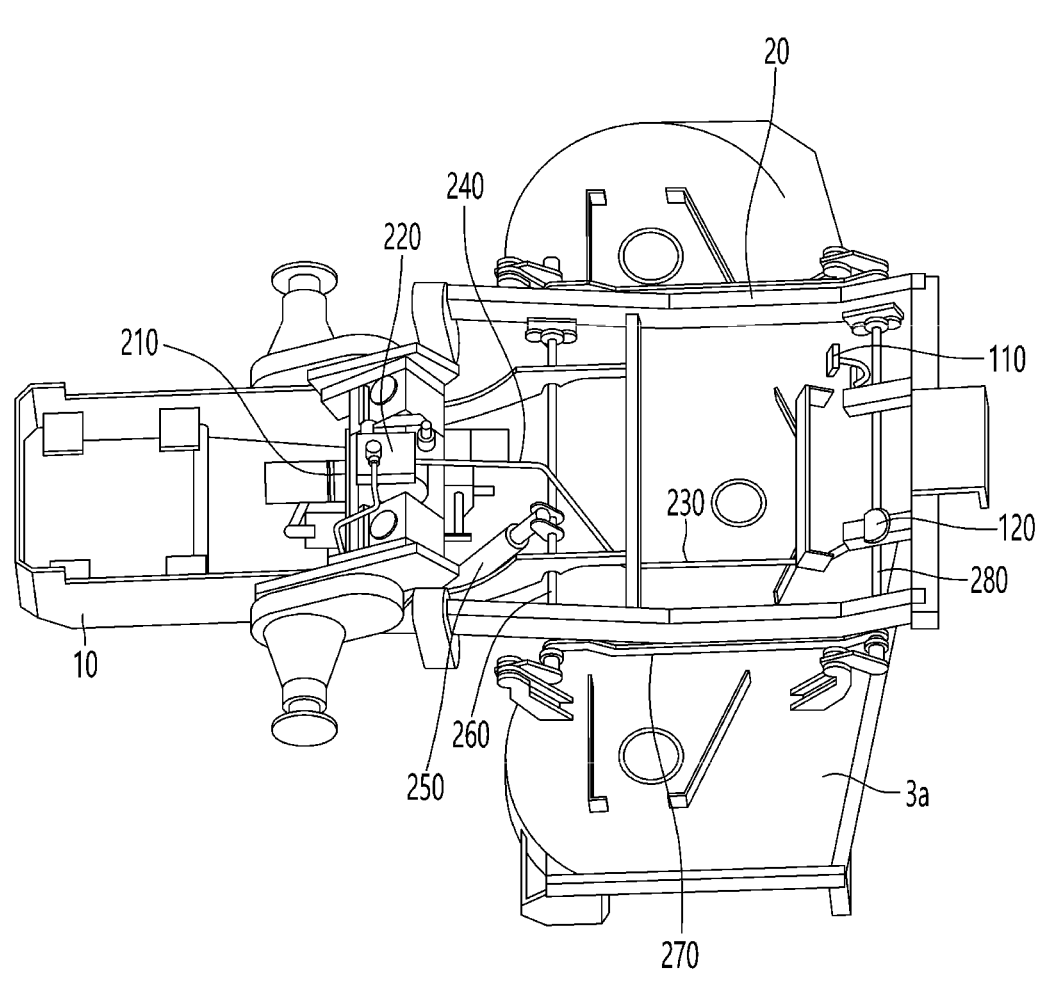
FIG. 4 is a view for explaining a configuration in which a mower unit is lifted down and up by a pedal in the riding-type mowing apparatus of the present embodiment.

FIG. 4 is a view for explaining a configuration in which a mower unit is lifted down and up by a pedal in the riding-type mowing apparatus of the present embodiment.

Referring to FIG. 4, the riding-type mowing apparatus according to the embodiment includes: a transmission 210 which is supported by the body frame 10; the bottom frame 20 coupled with the deck body 31 that constitutes the mower unit; the lift-down pedal 110 and the lift-up pedal 120 disposed on the bottom frame 20; a spool connection link 230 which is configured to be pushed rearward where the transmission 210 is present when the lift-down pedal 110 is pressed down as the spool connection link 230 is connected to the lift-down pedal 110 and the lift-up pedal 120, and which is configured to be pulled forward when the lift-up pedal 120 is pressed down; a valve spool 240 which is connected to the spool connection link 230 to allow the spool connection link 230 to move forward or to be pushed backward; a valve 220 in which hydraulic pressure is changed according to movement of the valve spool 240; a hydraulic cylinder 250 connected to the valve 220, in which a length of the hydraulic cylinder 250 is varied according to the hydraulic pressure controlled by the valve; a rear lift shaft 260 which is connected to the hydraulic cylinder 250 to rotate clockwise or counterclockwise according to an extension or contraction of the hydraulic cylinder 250; a lift shaft connection link 270 which is connected to the rear lift shaft 260 to move forward or rearward according to rotation of the rear lift shaft 260; a front lift shaft 280 which is connected to the lift shaft connection link 270 to rotate clockwise or counterclockwise by the lift shaft connection link 270; and the mower unit which is connected to the front lift shaft 280 and the rear lift shaft 260 and is equipped with a blade that is lifted up or lifted down according to rotation of the lift shafts.

Regarding the operation of this configuration, when the user presses down the lift-down pedal 110, the spool connection link 230 is pushed rearward due to the pressing down of the lift-down pedal 110, and the valve spool 240 is also pushed rearward due to the rearward movement of the spool connection link 230.

The hydraulic pressure of the hydraulic cylinder 250 connected to the valve 220 is released by the rearward movement of the valve spool 240, and accordingly, a force applied to lift up the mower unit, which is lifted up by a force of the hydraulic pressure, is released, so that the mower unit may be naturally lifted down due to the weight of the mower unit itself.

On the contrary, when the user presses down the lift-up pedal 120, the spool connection link 230 connected to the lift-up pedal 120 is pulled forward, and thus the valve spool 240 is also pulled forward.

In this case, the hydraulic cylinder 250 expands due to the increase of the hydraulic pressure in the valve 220, the rear lift shaft 260 is pushed up by the expansion of the hydraulic cylinder 250. In this case, the front lift shaft 280 also rotates clockwise by the lift shaft connection links 270 provided on both sides of the bottom frame.

That is, as the rear lift shaft 260 and the front lift shaft 280 rotate in the same direction, the connected mower unit is lifted up.

As described above, the rising-type mowing apparatus according to the present embodiment is configured such that the user may easily manipulate the lift-down pedal with his/her left foot and the lift-up pedal with his/her right foot, the lift-down pedal and the lift-up pedal are spaced apart from the center of the driver seat, from the center of the both front wheels, or from the center of the bottom frame by the same distance, so that it is less likely that the user is confused and erroneously manipulate the lift-up and lift-down pedals.

What is claimed is:

1. A riding-type mowing apparatus in which a mower unit is disposed below a body frame to mow grass through a blade mounted in the mower unit and a driver seat is provided on the body frame, the riding-type mowing apparatus comprising:

a steering lever provided on both sides of the driver seat to operate traveling of the riding-type mowing apparatus;

a brake pedal provided on a bottom frame disposed in front of the body frame to brake the riding-type mowing apparatus; and a lift-down pedal and a lift-up pedal disposed on both sides of the brake pedal to lift-down and lift-up the mower unit, respectively, wherein the riding-type mowing apparatus further comprises two front wheels coupled to both sides of the bottom frame, respectively, wherein the brake pedal is provided on a virtual line connecting a central position of the two front wheels and a center of the driver seat, wherein the lift-down pedal and the lift-up pedal are disposed symmetrically with respect to the brake pedal and are provided at positions spaced apart from the brake pedal by a same distance, respectively, wherein the lift-down pedal and the lift-up pedal are provided at positions spaced apart from the central position of the two front wheels by a same distance, respectively, and wherein the lift-down pedal and the lift-up pedal are disposed slightly ahead of the brake pedal.

2. The mowing apparatus of claim 1, further comprising: a transmission which is supported by the body frame; a spool connection link which is configured to be pushed rearward where the transmission is present when the lift-down pedal is pressed down as the spool connection link is connected to the lift-down pedal and the lift-up pedal, and which is configured to be pulled forward when the lift-up pedal is pressed down; a valve spool which is connected to the spool connection link to allow the spool connection link to move forward or to be pushed backward; a valve in which hydraulic pressure is changed according to movement of the valve spool; a hydraulic cylinder connected to the valve, in which a length of the hydraulic cylinder is varied according to the hydraulic pressure controlled by the valve; a rear lift shaft which is connected to the hydraulic cylinder to rotate clockwise or counterclockwise according to an extension or contraction of the hydraulic cylinder; a lift shaft connection link which is connected to the rear lift shaft to move forward or rearward according to rotation of the rear lift shaft; and a front lift shaft which is connected to the lift shaft connection link to rotate clockwise or counterclockwise by the lift shaft connection link, wherein the mower unit is connected to the front lift shaft and the rear lift shaft to be lifted up or down according to rotation of the front lift shaft and the rear lift shaft.

\* \* \* \* \*